United States Patent [19]

Kuch

[11] Patent Number: 5,177,760

[45] Date of Patent: Jan. 5, 1993

[54] GAS LASER WITH INTERNAL GAS RESERVOIR HAIVNG LONG REGENERATION PATH

[75] Inventor: Joseph Kuch, Haifa, Israel

[73] Assignee: Laser Industries Ltd., Tel-Aviv, Israel

[21] Appl. No.: 753,169

[22] Filed: Aug. 30, 1991

[30] Foreign Application Priority Data

Oct. 5, 1990 [IL] Israel .................................. 95906

[51] Int. Cl.⁵ ................................ H01S 3/03
[52] U.S. Cl. ........................... 372/61; 372/35; 372/58
[58] Field of Search .......... 372/58, 61, 63, 55, 372/35

[56] References Cited

U.S. PATENT DOCUMENTS 4,752,937 6/1988 Gorisch et al. ................. 372/61
5,020,070 5/1991 Lombardo ..................... 372/65

Primary Examiner—James W. Davie
Attorney, Agent, or Firm—Benjamin J. Barish

[57] ABSTRACT

A gas laser includes an inner tube filled with gas and having mirrors at its opposite ends to define a resonant chamber, an outer tube filled with gas and defining a gas reservoir for the gas in the resonant chamber, and electrodes for energizing the gas in the resonant chamber. The gas reservoir includes a pair of intermediate tubes coaxial with and between the inner and outer tubes. One of the intermediate tubes is open at one end facing one end of the laser and is joined at its opposite end facing the opposite end of the laser to the outer tube. The other intermediate tube is open at its end facing the opposite end of the laser and is joined at its end facing the one end of the laser to the inner tube, whereby the pair of intermediate tubes divide the reservoir into a plurality of annular spaces defining a zigzag path between the opposite ends of inner tube.

11 Claims, 1 Drawing Sheet

GAS LASER WITH INTERNAL GAS RESERVOIR HAIVNG LONG REGENERATION PATH

FIELD AND BACKGROUND OF THE INVENTION

The present invention relates to gas lasers, and particularly to the type of gas lasers which includes a gas resonant chamber and also a gas reservoir for regenerating the gas in the resonant chamber.

Early gas lasers, particularly of the carbon dioxide type, included an arrangement for circulating the gas through the tube from a gas reservoir externally of the tube in order to regenerate the gas within the tube. Later constructions included a gas reservoir within the tube, but in such constructions care had to be exercised to avoid creating a discharge in the gas reservoir. One construction of the latter type provided a glass helix at one end of the laser tube connecting the gas reservoir to the resonant chamber, and thereby increasing the length of the pathway from the reservoir to the resonant chamber. However, forming the glass helix within the laser tube is complicated and costly. Moreover, even such a construction tends to produce a discharge in the gas reservoir particularly when the laser is operated in the "super pulse" mode, wherein a high voltage is applied to obtain high peak currents for short durations. A further disadvantage of the helical construction is that the cross-section of the regeneration path (helix) is relatively small, and therefore the gas recovery time is relatively long; that is, it may be necessary to wait a few minutes between laser discharges particularly when the laser is operated in the "super pulse" mode.

OBJECTS AND BRIEF SUMMARY OF THE INVENTION

An object of the present invention is to provide a gas laser of a novel construction having advantages in the above respects.

According to the present invention, there is provided a gas laser comprising an inner tube filled with gas and having mirrors at its opposite ends to define a resonant chamber, an outer tube filled with gas and defining a gas reservoir for the gas in the resonant chamber, and electrodes for energizing the gas in the resonant chamber; characterized in that the gas reservoir includes a pair of intermediate tubes coaxial with and between the inner and outer tubes. One of the intermediate tubes is open at one end facing one end of the laser and is joined at its opposite end facing the opposite end of the laser to the outer tube. The other intermediate tube is open at its end facing the opposite end of the laser and is joined at its end facing the one end of the laser to the inner tube, whereby the pair of intermediate tubes divide the reservoir into a plurality of annular spaces defining a zigzag path between the opposite ends of the inner tube.

In the described preferred embodiment, the pair of intermediate tubes extend for a major part of the length of the inner and outer tubes.

Also in the described preferred embodiment, the laser includes a further tube coaxial with, and spaced slightly outwardly of, the inner tube and defining with it, and with the innermost one of the intermediate tubes, an annular passageway around the inner tube for circulating a cooling fluid.

It has been found that a gas laser constructed in accordance with the foregoing features provides a recovery path of much larger cross-section than the helix for gas flow between the gas reservoir and the resonant chamber, thereby substantially reducing the gas recovery time required between operations of the laser, even when the laser is operated in the "super pulse" mode. Such a construction also substantially reduces or eliminates discharge in the gas reservoir, as well as other spurious discharge problems. A further advantage in the novel construction is that it is much simpler and less expensive to produce when compared to the helical path construction now used for gas lasers of this type.

The invention is particularly useful with respect to carbon dioxide type of gas lasers.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
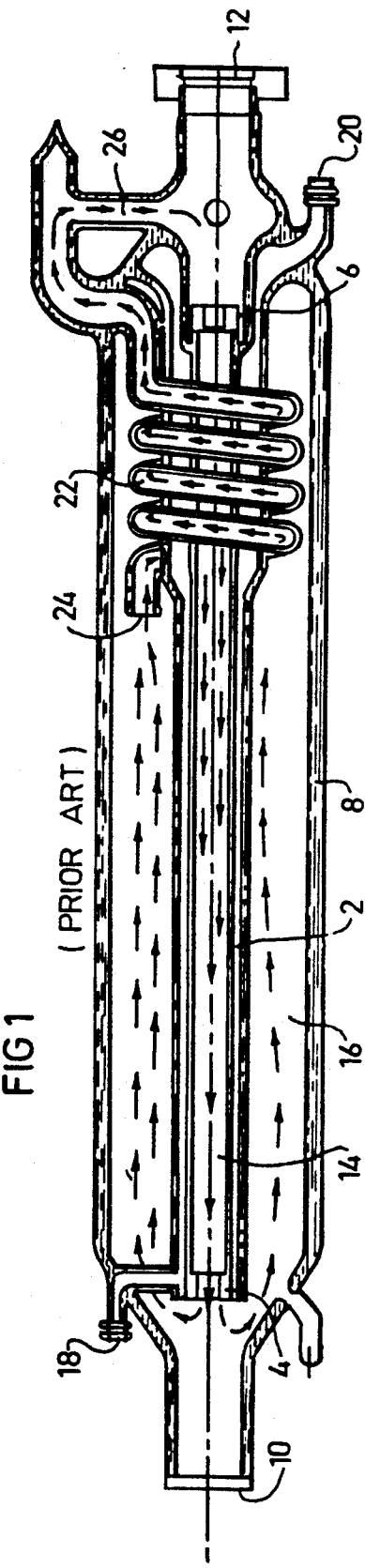
FIG. 1 is a longitudinal sectional view illustrating a helical-type gas laser presently known in the prior art.

The helical-type gas laser presently known in the prior art, as shown in FIG. 1, includes a double-jacketed inner tube 2 whose interior is filled with a gas which is energized by a pair of electrodes 4, 6 at the opposite ends of the tube, and an outer tube 8 coaxial with the inner tube 2. The laser further includes a front partial reflector 10 at one end, and a rear total reflector 12 at the opposite end. The tube is filled with a gas so that the space within the inner double-jacketed tube 2 defines a resonant chamber, whereas the space between the inner double-jacketed tube 2 and the outer tube 8 defines a reservoir 16 for regenerating the gas within the resonant chamber 14.

The space between the two jackets of the inner tube 2, is used for circulating a cooling fluid, such as water, inletted via an inlet port 18 and outletted via an outlet port 20.

In the helical-type gas laser of the prior art as illustrated in FIG. 1, the gas reservoir 16 communicates with the resonant chamber 14 by means of a helix 22 formed at one end of the laser tube. Thus, helix 22 has an inlet opening 24 communicating with the gas reservoir 16, and an outlet opening 26 communicating with one end of the resonant chamber 14, such that the gas flowing from the reservoir to the resonant chamber travels along a relatively large helical path. As briefly described earlier, such a construction reduces the possibility of a discharge occurring in the gas reservoir 16, but at the same time it substantially increases the gas recovery time required between operations of the laser, particularly when operating in the "super pulse" mode. The known helical-type gas laser illustrated in FIG. 1 is also costly to produce, and moreover it does not complete suppress discharges in the gas reservoir particularly when the laser is operated in the "super pulse" mode.

Figure 2:
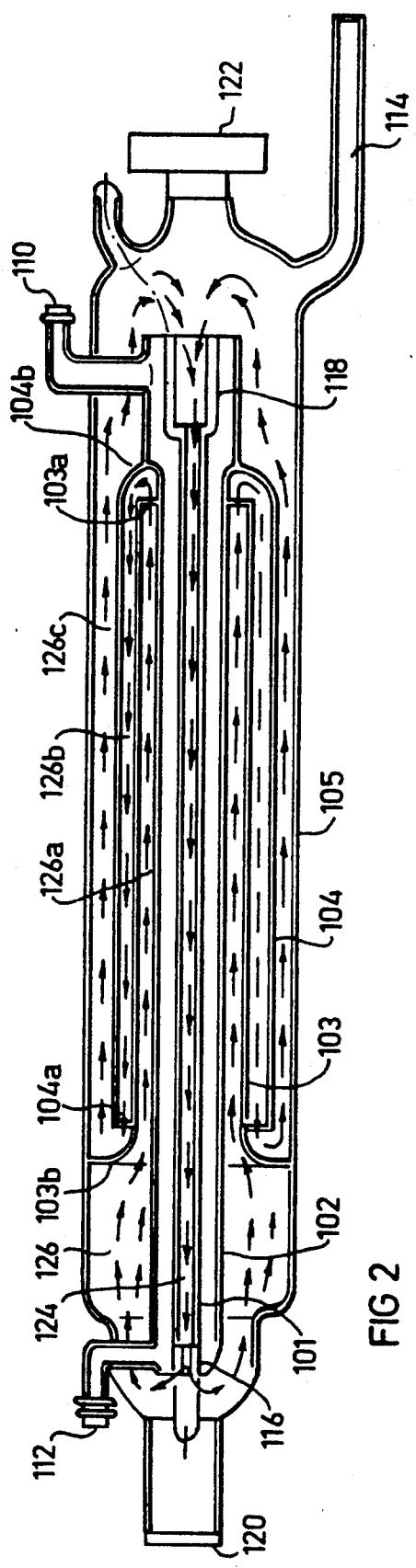
FIG. 2 is a longitudinal sectional view illustrating a gas laser constructed in accordance with the present invention.

FIG. 2 illustrates a laser constructed in accordance with the present invention to overcome the foregoing disadvantages.

The laser illustrated in FIG. 2 comprises five coaxial tubes 101–105 of increasing diameters. Tube 101 is open at both its end, whereas tube 102 is closed at both its ends except for an inlet port 110 for inletting a coolant fluid, such as water, and an outlet port 112 for outletting the cooling fluid. The third tube 103 is open at one end 103a, and is joined at its opposite end by a wall 103b to the outermost tube 105; whereas the fourth tube 104 is open at its end correspondent to wall 103b, as shown at 104a, and is joined by a wall 104b to tube 102 at the open end 103a of tube 103.

Except for the coolant fluid space between tubes 101 and 102, the laser illustrated in FIG. 2 is completely filled with gas, e.g., introduced via a gas-fill nipple 114 which is sealed after the gas has been introduced.

The opposite ends of the gas laser illustrated in FIG. 2 are supplied with the conventional electrodes 116, 118, and with the conventional rear total reflector 122 and front partial reflector 120.

The construction is such that the space within the inner tube 101, filled with gas, defines the resonant chamber, generally designated 124, whereas the space between tube 102 and the outer tube 105 defines the gas reservoir 126. The space between tubes 101 and 102 is used for circulating the coolant fluid, e.g., water.

As shown by the arrows illustrated in FIG. 2, the gas reservoir 126 communicates with the resonant chamber 124 via the annular pathways 126a, 126b, 126c, connected in zigzag fashion, i.e., alternating in directions, with the resonant chamber 124, thereby eliminating (or sharply decreasing) the possibility of producing discharges in the gas reservoir even when the laser is operated in the "super pulse" mode. In addition, these annular passageways 126a, 126b, 126c can be made of substantially larger cross-sectional area than the helix in the prior art helical-type laser illustrated in FIG. 1, thereby substantially decreasing the gas recovery time of the laser even when operated in the "super pulse" mode. A further advantage of the construction illustrated in FIG. 2 is that it is much simpler and less expensive to produce than the helicaltype construction of the prior art laser illustrated in FIG. 1.

Tubes 101, 102 and 105 are of substantially the same length; whereas the two intermediate tubes 103 and 104 are of smaller length. The longer the length of these intermediate tubes 103, 104, the longer the regeneration path for the gas flowing from the reservoir 126 to the resonant chamber, and therefore the less possibility for an electrical discharge to be produced in the gas reservoir. Preferably, tubes 103 and 104 extend for the major part of the length of the tubes 101, 102 and 105, i.e., at least one-half their lengths.

While the invention has been described with respect to one preferred embodiment, it will be appreciated that many variations, modifications and other applications of the invention may be made.

What is claimed is:

1. A gas laser, comprising an inner tube filled with gas and having mirrors at its opposite ends to define a resonant chamber, an outer tube filled with gas and defining a gas reservoir for the gas in the resonant chamber, and electrodes for energizing the gas in the resonant chamber; characterized in that said gas reservoir includes a pair of intermediate tubes coaxial with and between said inner and outer tubes; one of said intermediate tubes being open at one end facing one end of the laser and joined at its opposite end facing the opposite end of the laser to said outer tube; the other of said intermediate tubes being open at its end facing said opposite end of the laser and joined at its end facing said one and of the laser to said inner tube, whereby said pair of intermediate tubes divide the reservoir into a plurality of annular spaces defining a zigzag path between the opposite ends of said inner tube.

2. The gas laser according to claim 1, wherein said pair of intermediate tubes extend for a major part of the length of said inner and outer tubes.

3. The gas laser according to claim 1, including a further tube coaxial with, and spaced slightly outwardly of, the inner rube and defining with it, and with the innermost one of the intermediate tubes, an annular passageway around said inner tube for circulating a cooling fluid.

4. The gas laser according to claim 1, wherein all said tubes are of glass or quartz.

5. The gas laser according to claim 1, wherein said gas includes carbon dioxide.

6. A gas laser, comprising:
    an inner tube filled with gas and having mirrors at its opposite ends to define a resonant chamber, an outer tube filled with gas and defining a gas reservoir for the gas in the resonant chamber;
    a pair of intermediate tubes coaxial with and between said inner and outer tubes and extending for a major part of the length of said inner and outer tubes;
    one of said intermediate tubes being open at one end facing one end of the laser and joined at its opposite end facing the opposite end of the laser to said outer tube; the other of said intermediate tubes being open at its end facing said opposite end of the laser and joined at its end facing said one end of the laser to said inner tube, whereby said pair of intermediate tubes divide the reservoir into a plurality of annular spaces defining a zigzag path between the opposite ends of said inner tube;
    and electrodes for energizing the gas in the resonant chamber.

7. The gas laser according to claim 6, including a further tube coaxial with, and spaced slightly outwardly of, the inner tube and defining with it, and with the innermost one of the intermediate tubes, an annular passageway around said inner tube for circulating a cooling fluid.

8. A gas laser comprising:
    first, second, third, fourth and fifth coaxial tubes of increasing diameters;
    a front partial reflector at one end of said tubes;
    a rear total reflector at the opposite end of said tubes;
    a coolant fluid inlet port communicating with one end of the annular space between said first and second tubes, and an outlet port communicating with the outlet end of said annular space for circulating a coolant fluid in said annular space between said first and second tubes;
    a gas filling the remaining spaces between said tubes to define a resonant chamber within the inner tube, and a gas reservoir in the spaces between said second, third, fourth and fifth tubes;
    and electrodes for exciting the gas within said resonant chamber;
    said third tube being open at one end of the laser and joined to said fifth tube at the opposite end of the laser, and said fourth tube being open at said opposite end of the laser and being joined at said one end of the laser to said second tube, whereby the spaces between the second, third, fourth and fifth tubes define a gas reservoir communicating with each other and with the opposite ends of said first tube in zigzag fashion.

9. The gas laser according to claim 8, wherein said first, second and fifth tubes are of substantially the same length, and said first and second tubes are of a length more than one half the length of said first, second and fifth tubes.

10. The gas laser according to claim 8, wherein all said tubes are of glass or quartz.

11. The gas laser according to claim 8, wherein said gas includes carbon dioxide.

* * * * *